Jan. 19, 1971

C. R. ADAMS 3,556,560

COUPLING FOR SEMITRAILER UNITS

Filed July 30, 1968

INVENTOR.
CHARLES R. ADAMS
BY
Williamson, Palmatier & Bains
ATTORNEYS

INVENTOR.
CHARLES R. ADAMS

# United States Patent Office 3,556,560
Patented Jan. 19, 1971

3,556,560
COUPLING FOR SEMITRAILER UNITS
Charles R. Adams, General Delivery, Des Arc, Mo.
Filed July 30, 1968, Ser. No. 752,446
(Filed under Rule 47(b) and 35 U.S.C. 118)
Int. Cl. B62d 53/00
U.S. Cl. 280—415          5 Claims

ABSTRACT OF THE DISCLOSURE

An improved semitrailer-converter dolly coupling arrangement utilizing a wheeled converter dolly having a fifth wheel rotatably mounted thereon, and a semitrailer having a fifth wheel plate under its front end to which is movably secured a rectilinear coupling member adapted to be snugly received within a complementary coupling aperture or recess in said fifth wheel of said dolly. The converter dolly is employed to connect said semitrailer in a tandem arrangement behind a lead semitrailer drawn behind a tractor. Braking means supported on said dolly may be selectively operated to prevent rotation of said fifth wheel, and thus of the front end of said semitrailer rigidly coupled thereto, in order to assist in controlling and steering said semitrailer.

BACKGROUND OF THE INVENTION

The highway use by truckers of two trailers connected in tandem behind a pull tractor has been increasing in recent years. Such tandem rigs are known in the trucking industry as a "set of doubles." There are actually two types of "sets of doubles" in use. One type consists of a tractor pulling a semitrailer to which a second, full trailer, having a fixed front axle, is coupled by a drawbar. The second type comprises a tractor-semitrailer combination with a second semitrailer coupled behind the lead semitrailer by means of a converter dolly. The converter dolly is a drawbar frame mounted on a wheeled axle, and is coupled under the front end of the rear semitrailer, thereby converting the rear semitrailer to a full trailer. The multiple pivot connections between the several trailer units of a "set of doubles" greatly amplify the tendency of such rigs to jackknife on slippery roads, and make it very difficult to control and steer multiple trailer units when backing the rig.

These problems are particularly pronounced with the above-noted second type of "set of doubles." The reason for this is that a standard fifth wheel arrangement has conventionally been utilized on the converter dolly to pivotally support a mating fifth wheel plate on the front end of the rear semitrailer. In such an arrangement a kingpin on the fifth wheel plate is pivotally supported within an opening in the fifth wheel, and relative pivotal movement between the dolly and the rear trailer's front end takes place along the vertical axis of the kingpin at the greased bearing surface between the fifth wheel and the fifth wheel plate. It is very difficult to selectively lock or brake such a fifth wheel joint to prevent pivoting of the front end of the rear semitrailer relative to the dolly, where necessary to do so to prevent jackknifing or to obtain the necessary steering control when backing the rig. Indeed, there is no known brake means by which such a fifth wheel pivot joint can be selectively locked. Also, there is a real need for a coupling arrangement which will perimt the same semitrailer to be coupled to either a converter dolly in a tandem trailer hookup or directly to the standard fifth wheel of a tow tractor, in accordance with the truckers' needs.

BRIEF SUMMARY OF THE INVENTION

The present invention has been particularly developed with a view towards overcoming the aforesaid difficulties and disadvantages associated with the abovementioned second type of "set of doubles."

Accordingly, this invention is particularly characterized by a semitrailer and converter dolly so constructed and arranged as to provide for proper braking and steering control of the pivotal joint therebetween, while retaining the versatility of the semitrailer for multiple use in either a tandem trailer hookup or in a single trailer rig wherein the semitrailer is coupled directly to the fifth wheel of a tow tractor.

These basic objectives are realized by incorporating unique coupling features in both the converter dolly and in the towed semitrailer. The converter dolly consists of a frame and drawbar unit mounted on an axle and wheels; and the converter dolly of this invention incorporates as its salient feature a fifth wheel which is rotatably supported for rotary or pivotal movement about a vertical axis on a bearing race or table. A coupling recess or aperture having straight side walls is provided in the aforesaid fifth wheel, and is adapted to receive in rigid, locking engagement therewith a complementary coupling member carried on the front end of a semitrailer. The coupling member on the semitrailer is contoured to conform to the shape of the coupling aperture and the fifth wheel of the converter dolly, and when positioned therein serves to rigidly join the front end of the semitrailer to the fifth wheel for rotation therewith upon said bearing table.

A particularly advantageous feature of this invention resides in the utilization of friction braking means operably associated with the fifth wheel of the converter dolly for preventing or restraining the rotation thereof so as to control the relative pivotal action between the front end of said semitrailer and said converter dolly. The converter dolly is utilized to pivotally connect the aforesaid semitrailer to a lead semitrailer coupled behind a tow tractor, thereby providing a "set of doubles." The brake means in the tractor cab may be actuated manually to assist in steering the tandem rig and in preventing jackknifing between the several trailer units.

As a further significant and beneficial feature of this invention, the aforesaid coupling member on the rear semitrailer is shiftably mounted to the underside thereof so that it can be moved between a first position of non-use and a second, coupling position in which it is held in engagement with a fifth wheel plate mounted to the frame of the semitrailer. Thus, by shifting the coupling member to one position or the other, my specially modified semitrailer may be coupled to either the improved converter dolly of this invention in a "set of doubles" tractor-trailer combination, or to the standard fifth wheel of a tow tractor.

These and other objects and advantages of this invention will become readily apparent as the following description is read in conjunction with the accompanying

BRIEF DESCRIPTION OF THE DRAWINGS

FIG. 1 shows a "set of doubles" of the type to which this invention is directed. The multiple trailer rig of FIG. 1 is comprised of a tow tractor 1, to which a first or lead semitrailer 2 is connected by a standard fifth wheel 4. A second or rear semitrailer 6 is coupled behind lead trailer 2 by means of a converter dolly 8. As will more fully appear by reference to the description below, rear semitrailer 6 is of the known type having a set of rear wheels but no front axle or front wheels, but only a fifth wheel plate and kingpin under its front end by means of which it may be coupled to and supported on a tow vehicle. Wheled converter dolly 8 supports the front end of semitrailer 6 and serves to convert it into a full trailer for connection behind lead, semitrailer 2. The unique fifth wheel joint of this invention between semitrailer 6 and converter dolly 8 is indicated generally by reference numeral 10 in FIG. 1.

With reference to FIGS. 2 and 3, converter dolly 8 is comprised of a channel iron frame 12 having longitudinally extending channel beams 13 and transversely extending channel braces 14 and 15. At its forward end, converter dolly 8 is provided with a drawbar section comprised of channel iron beams 16 and 17 arranged in an A-frame configuration as appears most clearly in FIG. 1. Dolly drawbar segments 16 and 17 are connected at their forward ends to the rear of lead semitrailer 2 by a standard pivotal coupler 18 shown in FIG. 1.

Figure 2:
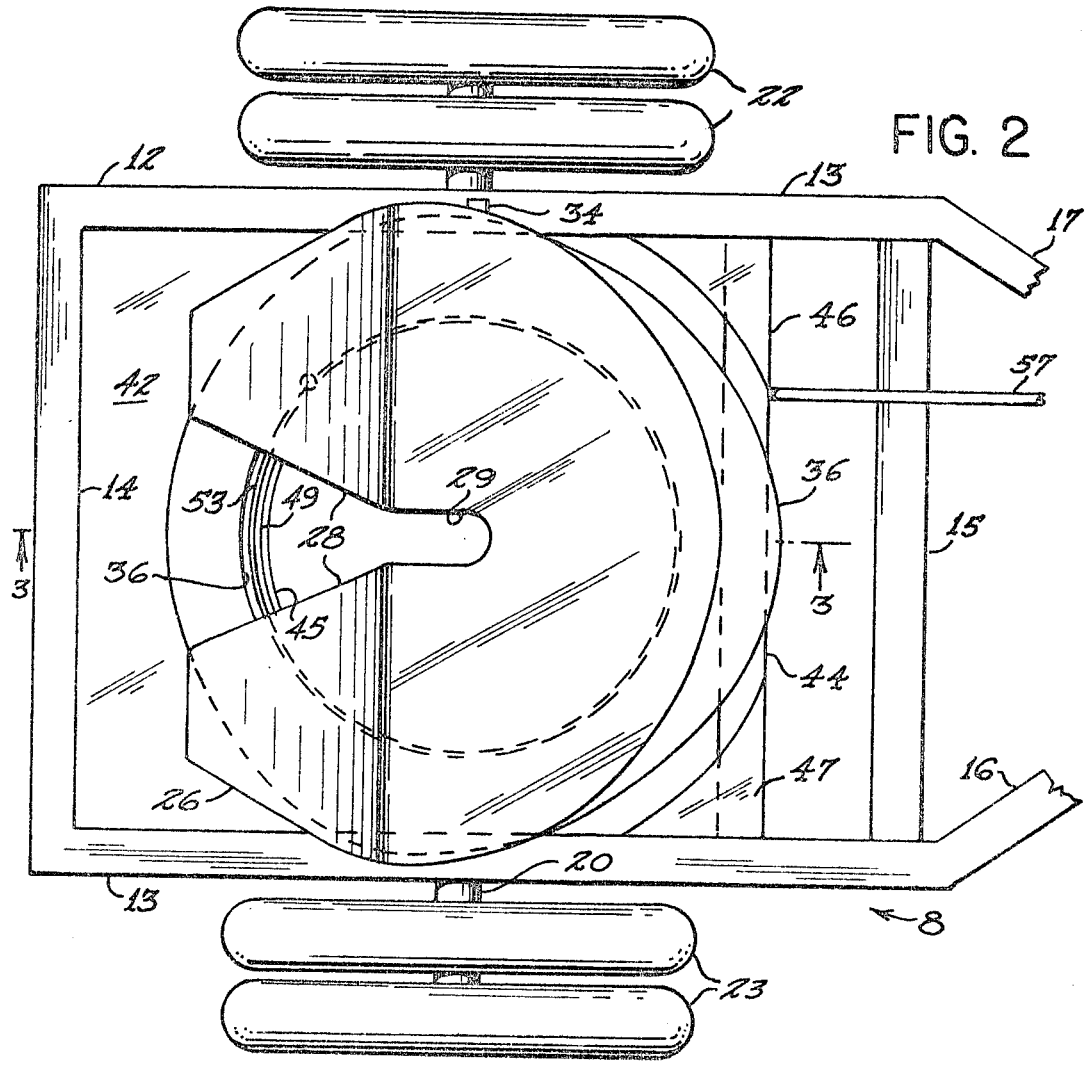
FIG. 2 is a top, plan view of the improved converter dolly of this invention.
Figure 3:
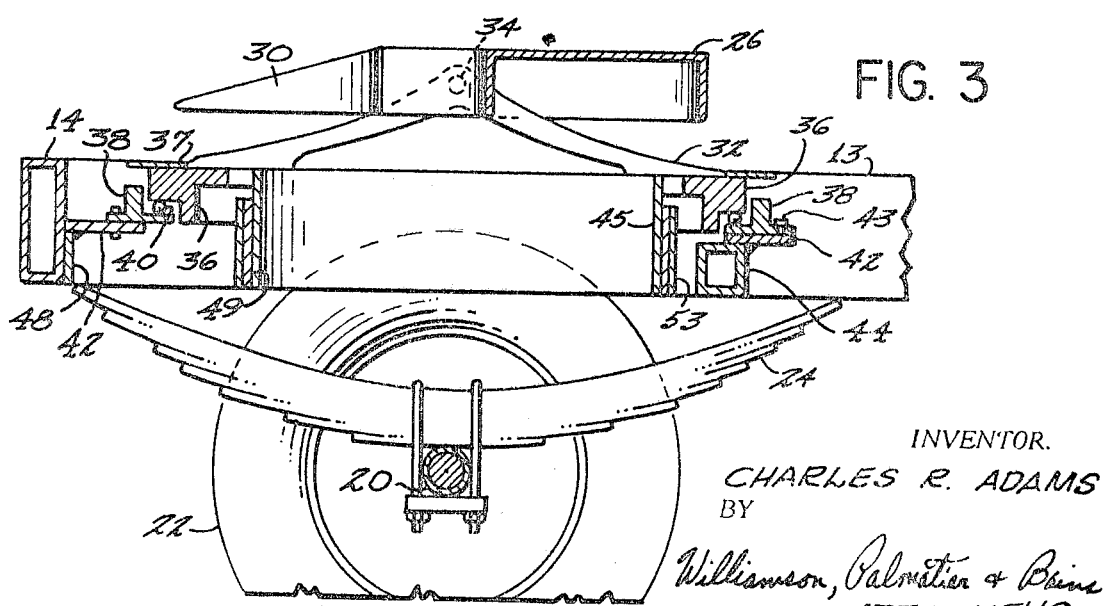
FIG. 3 is a vertical section view taken along lines 3—3 of FIG. 2.

The converter dolly of FIGS. 2 and 3 has an axle 20 to which wheels 22 and 23 are attached. Dolly frame 12 is supported upon axle 20 by means of leaf springs 24 in a conventional manner.

Mounted on dolly frame 12 is a fifth wheel 26 having a V-shaped coupling aperture or recess 28 formed in its rear portion. Fifth wheel 26 also includes a circular opening 29 sensually thereof and communicating with a V-shaped aperture 28 within which the standard kingpin of a semitrailer's fifth wheel plate may be received. Aperture 28 of fifth wheel 26 includes downwardly depending skirt or wall portions 30 which serve to engage a mating coupling member at the front end of a semitrailer in a manner hereinafter described. Fifth wheel 26 is supported on upwardly extending rib members 32 by means of pivot pins 34 for pivotal movement about the horizontal axis extending therethrough. Ribs 32 are of arcuate shape and terminate at their lower ends at an annular ring 37 to which they are rigidly secured as by welding. Fifth wheel base plate 37 is secured, preferably by welding to an upper bearing race 36 which is rotatable relative to a lower, bearing race 38 upon ball bearings 40 disposed therebetween. Lower bearing race 38 is rigidly attached to dolly frame 12 as by being bolted to stationary plate 42 having a circular, inner opening which conforms generally to the shape of lower bearing race 38. Bolts 43 connecting bearing race 38 to plate 42 are shown in FIG. 3. Plate 42 rests at its forward end upon a cross brace 44 to which it is welded, cross brace 44 being secured at its outer ends to dolly channels 13 by means of gusset plates 46 and 47 (FIG. 2). The rear portion of bearing support plate 42 rests upon a cross brace or bracket member 48 welded to dolly frame transverse beam 14.

Figure 1:
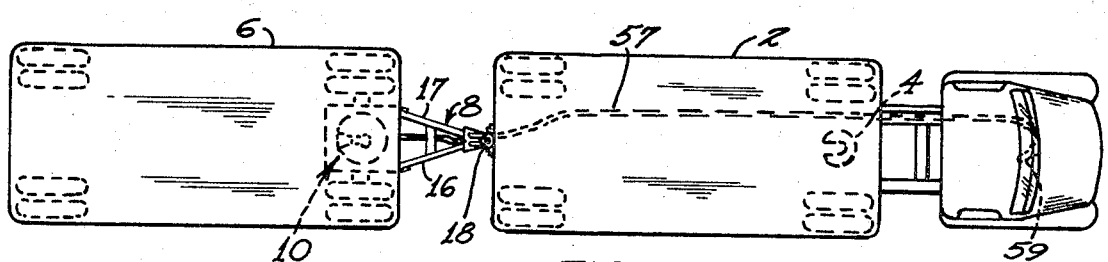
FIG. 1 is a top, plan view of a "set of doubles" utilizing the improved converter dolly and rear semitrailer coupling arrangement of this invention.

Since converter dolly 8 will be pivotal with respect to both lead semitrailer 2 at coupler 18 and with respect to the rear semitrailer 6 at fifth wheel joint 10, it is readily apparent that the "set of doubles" shown in FIG. 1 will be especially difficult to steer, particularly when backing the rig, and that there also will be a pronounced tendency for jackknifing at the several pivot points 10, 18 and 4. The tendency of the tandem rig of FIG. 1 to jackknife on slippery roads as well as the steering encountered when backing the rig can be significantly minimized by providing some means for controlling the relative pivotal movement between converter dolly 8 and rear semitrailer 6. By virtue of the unique rotary mounting arrangement of dolly fifth wheel 26 on bearing race 36, this objective is readily attainable by attaching brake drum 45 to the fifth wheel assembly for rotation therewith. As is indicated in FIG. 3, brake drum 45 is secured to the underside of fifth wheel base ring 37, as by welding. Various types of friction-braking arrangements such as brake shoes, brake clamps or jaws which could be mounted either internally or externally of brake drum 45 could obviously be employed to frictionally engage drum 45. In the preferred embodiment shown in FIGS. 2 and 3 there is illustrated a circular brake band 53 having brake lining 49 on its inner surface adapted to encircle the lower portion of downwardly brake drum 45. Any of the well-known brake actuating mechanisms may be employed to selectively tighten and release brake band 53 about brake drum 45. For example, a pneumatic motor of the diaphragm type may be used to actuate linkage connected to brake band 53 in the manner shown in U.S. Pat. No. 3,101,959. The flow of pressurized air through supply hose to the brake actuating mechanism may be controlled by a manual valve located in tractor cab 1, such a supply hose 57 and actuating valve 59 being shown in FIG. 1.

Figure 4:
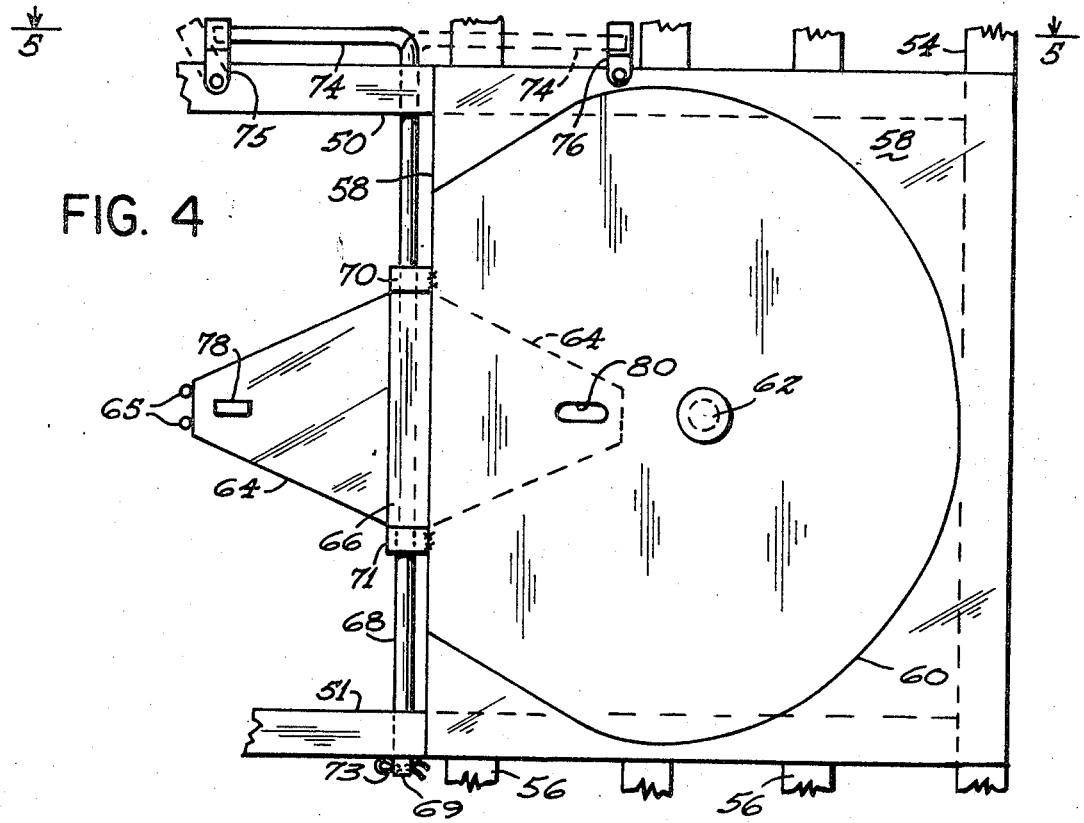
FIG. 4 is a bottom, plan view of the front end of a semitrailer incorporating the movable coupling member of this invention.
Figure 5:
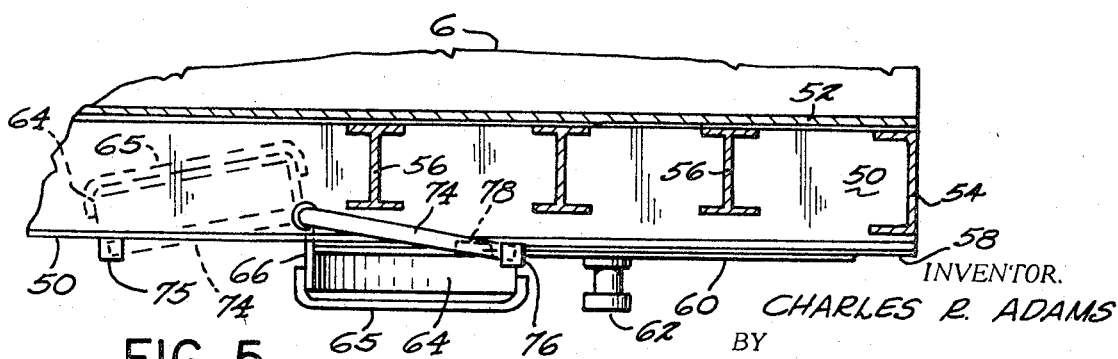
FIG. 5 is a side-elevation view of the coupling apparatus shown on the underside of a semitrailer in FIG. 4, taken along lines 5—5.

In order to permit rear semitrailer 6 to be coupled to converter dolly 8 in the proper manner which will provide relative pivotal movement therebetween about a vertical axis, the front end of semitrailer 6 has been modified in a unique manner as illustrated in the FIGS. 4 and 5. Longitudinally extending I-beams 50 and 51, forward I-beam 54, and transverse I-beam 56 form a frame or chassis upon which the floor 52 of trailer body 6 is supported. To the underside of I-beams 50 and 51 is welded a support plate 58 to which a fifth wheel plate 60 is welded. Fifth wheel plate 60 is contoured to conform substantially to shape of fifth wheel plate 26 on converter dolly 8, and is provided with a standard kingpin 62 which is adapted to be received within circular opening 29 of fifth wheel plate 26. Semitrailer 6 may thus be coupled to a standard fifth wheel of a tow tractor with kingpin 62 rotatably positioned within a circula opening in the tractor's fifth wheel with relative rotary movement taking place between the fifth wheel of the tractor and fifth wheel plate 60 upon the greased bearing surface therebetween in the conventional manner. For the purpose of connecting semitrailer 6 to my unique converter dolly 8, I have provided on the underside of the front end of semitrailer 6 a movable coupling member 64. Member 64 is of rectilinear shape, and preferably takes the form of a wedge or V-shaped block. Coupling member 64 is reinforced by tubular bars 65 which extend around its outer periphery. Coupling member 64 is attached to an operating rod 68 by means of a plate or bracket member 66, operating rod 68 being rotatably supported in hinges 70 and 71 attached to support plate 58. One end 69 of operating rod 68 extends through I-beam 51 and is rotatably journalled therein, cotter pin 73 serving to hold rod 68 in place. The opposite end of operating rod 68 extends through I-beam 50 and is provided with a handle portion 74 by means of which it may be rotated. By utilizing handle 74 to revolve operating rod 68, coupling member 64 may be swung or shifted from its first position of non-use shown in solid lines in FIG. 4 to second, coupling position shown in phantom lines in FIG. 4. Latches 75 and 76 are pivotally attached to the underside of beam 50 and serve to releasably retain operating handle 74 in either the forward or rearward position to which it is swung. A locking element in the form of lug 78 depends outwardly and downwardly from the face of coupling member 64, and is constructed and arranged to be received within complementary opening 80 in the bottom of fifth wheel plate 60 when coupling member 64 is shifted to its second position of use. Coupling member 64 is shown swung to its forward or coupling position in FIG. 5 with lug 78 protruding upwardly into slot 80 of fifth wheel plate 60. The engagement of lug 78 with slot 80 prevents relative, horizontal movement between coupling member 64 and fifth wheel plate 60, thereby insuring that coupling member 64, fifth wheel plate 60 and thus the entire front end of semitrailer 6 will pivot together as a unit when coupled to converter dolly 8.

When it is desired to couple semitrailer 6 to converter dolly 8, shiftable latch 75 is pivoted to release handle 74 from the solid line position in which it is shown in FIG. 4, and handle 74 is swung to the forward, phantom line position shown in FIG. 4. Latch 76 is then pivoted into place under handle 74 in order to hold it in its forward position. The rotation of operating rod 68, as handle 74 is swung to its forward position, will cause coupling member 64 to be pivoted from its rear position of non-use to its foward phantom line position of FIG. 5 wherein lug 78 engages slot 80 of fifth wheel plate 60. It is to be noted that with coupling member 64 in its forward, coupling position it is in direct alignment with kingpin 62. Then, as converter dolly 8 is backed under the front end semitrailer 6, kingpin 62 will pass through coupling aperture 28 into circular recess 29 of fifth wheel plate 26, and coupling wedge 64 will be brought into snug engagement with aprons or side walls 30 of aperture 28. With coupling block or wedge 64 seated within aperture 28, fifth wheel plate 60 and fifth wheel 26 will be firmly and securely coupled together and there will thus be no possibility of any relative, rotary movement therebetween. Rather, fifth wheel plate 60 will rotate with fifth wheel 26 upon bearing race 36 to provide the necessary and desirable pivotal action between the front end of trailer 6 and converter dolly 8. Fifth wheel 26 thus serves only as a coupling element for fifth wheel plate 60 and as a pad upon which the front end of semitrailer 6 may be supported. Because of the rigid connection between fifth wheel plate 60 and fifth wheel 26, all of the turning action between dolly 8 and semitrailer 6 takes place between bearing races 36 and 38.

In order to restrain or prevent relative rotary motion between semitrailer 6 and dolly 8 to prevent jackknifing on slippery roads or to obtain better steering control when backing the rig, brake band 53 may be tightened about brake drum 45 by actuating air valve 59 in the cab of tractor 1. The engagement of locking lug 78 within slot 80 of fifth wheel plate 60 assists in steering the front end of semitrailer 6 by transmitting torque thereto as fifth wheel 26 rotates upon fixed bearing race 38.

If it is desired to couple semitrailer 6 to a dolly having a standard fifth wheel plate, or directly to the fifth plate of a tow tractor (such as that shown at 1 in FIG. 1) it is only necessary to swing coupling member 64 to its rear position of non-use by pivoting operating handle 74 to its rear, solid line position shown in FIG. 4 and in phantom lines in FIG. 5. Coupling block 64 is then so located that it will not interfere with the connection of fifth wheel plate 60 and kingpin 62 to a standard fifth wheel plate. Thus, a semitrailer 6 provided with the unique shiftable coupling member 64 of this invention may be coupled to specially modified converter dolly 8 as its tow vehicle, and thus be converted into a full trailer for connection behind a leading trailer in a "set of doubles" arrangement; or, semitrailer 6 can be used as a semitrailer with the conventional tractor being utilized as its tow vehicle. This versatility of trailer use is of course not available with a full trailer because the fixed front axle of such a trailer pemits it to be connected only to a pivotal coupler (as shown at 18 in FIG. 1) by means of a drawbar frame connected to the wheeled axle.

The particular embodiments of this invention shown and described herein are for illustrative purposes only. It is contemplated that various changes may be made in the size, arrangement and proportions of the various parts without departing from the scope and spirit of this invention as defined by the following claims.

What is claimed is:

1. A converter dolly for converting a semitrailer into a full trailer comprising:
   a frame supported on an axle having wheels mounted on the opposite ends thereof;
   a fifth wheel rotatably supported on bearing means on said frame for pivotal movement about a vertical axis;
   and coupling means on said fifth wheel adapted to receive in locking engagement therewith a complementary coupling element on the front end of a semitrailer.

2. A converter dolly as defined in claim 1 and further including:
   brake means carried on said converter dolly frame and operative to prevent the rotation of said fifth wheel relative to said dolly frame.

3. A converter dolly as defined in claim 1 wherein:
   said fifth wheel is rigidly secured to an upper bearing race rotatable relative to a complementary lower bearing race upon rotary bearing elements disposed therebetween, said lower bearing race being attached to said dolly frame.

4. A semitrailer and tow vehicle coupled together as a tandem unit comprising:
   a frame for said tow vehicle supported on an axle having wheels at the opposite ends thereof;
   a fifth wheel rotatably supported on said frame for rotary movement about a vertical axis, said fifth wheel having a coupling aperture therein;
   a coupling member movably supported on the underside of the front end of said semitrailer and positioned within said fifth wheel aperture in locking engagement therewith, said aperture having straight side walls and said coupling member being contoured to conform to the shape of said aperture, said coupling member being movable between a first position of non-use and a second position in which a protruding element thereon extends upwardly into an opening in said fifth wheel plate when said coupling member is in said second position and engaged within said fifth wheel aperture, thereby preventing relative, horizontal movement between said coupling member and said fifth wheel plate and insuring that the front end of said semitrailer will be rigidly coupled to said fifth wheel and will thus revolve therewith about said vertical axis as said fifth wheel rotates upon said tow vehicle frame in response to the turning thereof.

5. In combination with a semitrailer, improved coupling means at the forward end thereof comprising:
   a fifth wheel plate secured to the underside of the front end of said semitrailer frame;
   a coupling member shiftably supported on the underside of said semitrailer frame, said coupling member being contoured to conform to the shape of a complementary coupling recess in the fifth wheel of a converter dolly to which said semitrailer may be connected;
   said coupling member being shiftable between a first position of non-use remote from said fifth wheel plate coupling and a second position in which it is in juxtaposition to said fifth wheel plate and extends thereunder; and a lug element extending outwardly from said coupling member and being constructed and arranged to be received within a complementary opening within said fifth wheel plate when said coupling member is shifted to said second position, thereby insuring that said coupling member, said fifth wheel plate and the front end of said semitrailer will move together as a unit when said semitrailer is coupled to said converted dolly.

References Cited
UNITED STATES PATENTS

| | | | |
|---|---|---|---|
| 2,188,727 | 1/1940 | Soulis | 188—3 |
| 2,838,323 | 6/1958 | Coustillac | 280—432X |
| 3,063,739 | 11/1962 | Davies | 280—438(A) |
| 3,169,012 | 2/1965 | Fagan | 280—415(.3)X |
| 3,347,563 | 10/1967 | Harbers | 280—415(.3)X |
| 3,421,777 | 1/1969 | Barker et al. | 280—408 |

LEO FRIAGLIA, Primary Examiner

U.S. Cl. X.R.

280—432, 476